(12) United States Patent
Valerio

(10) Patent No.: US 11,198,134 B2
(45) Date of Patent: Dec. 14, 2021

(54) SYSTEM AND METHOD FOR SEPARATING MATERIALS USING STIRRING MOTION, STRATIFICATION, AND VERTICAL MOTION

(71) Applicant: Thomas A. Valerio, Atlanta, GA (US)

(72) Inventor: Thomas A. Valerio, Atlanta, GA (US)

(73) Assignee: TAV HOLDINGS, INC., Atlanta, GA (US)

( * ) Notice: Subject to any disclaimer, the term of this patent is extended or adjusted under 35 U.S.C. 154(b) by 31 days.

(21) Appl. No.: 16/695,711

(22) Filed: Nov. 26, 2019

(65) Prior Publication Data

US 2020/0094261 A1    Mar. 26, 2020

Related U.S. Application Data

(63) Continuation of application No. 16/060,395, filed as application No. PCT/US2016/065458 on Dec. 7, 2016, now Pat. No. 10,486,164.

(Continued)

(51) Int. Cl.
| | |
|---|---|
| *B03B 5/32* | (2006.01) |
| *B03B 9/06* | (2006.01) |
| *B03B 9/04* | (2006.01) |
| *B09B 3/00* | (2006.01) |
| *B03B 5/34* | (2006.01) |
| *B03B 5/44* | (2006.01) |
| *B03B 5/38* | (2006.01) |
| *B02C 18/00* | (2006.01) |
| *B02C 23/10* | (2006.01) |

(Continued)

(52) U.S. Cl.
CPC ............ *B03B 5/32* (2013.01); *B02C 18/0084* (2013.01); *B02C 23/10* (2013.01); *B03B 5/34* (2013.01); *B03B 5/38* (2013.01); *B03B 5/44* (2013.01); *B03B 5/623* (2013.01); *B03B 9/04* (2013.01); *B03B 9/06* (2013.01); *B03B 9/065* (2013.01); *B09B 3/00* (2013.01); *B03B 2009/068* (2013.01); *B04C 2009/007* (2013.01); *Y02W 30/52* (2015.05); *Y02W 30/58* (2015.05)

(58) Field of Classification Search
CPC .... B03B 5/28; B03B 5/30; B03B 5/32; B03B 5/36; B03B 5/38; B03B 5/44; B03B 5/442; B03B 5/62; B03B 5/623; B03B 5/66; B03B 5/68; B03B 7/00; B03B 9/04; B03B 9/06; B03B 9/065; B03B 11/00; B03B 2011/008; B02C 18/0084; B02C 23/10

See application file for complete search history.

(56) References Cited

U.S. PATENT DOCUMENTS

| | | | | |
|---|---|---|---|---|
| 1,545,636 | A | * 7/1925 | Chance ..................... | B03B 5/38 209/172.5 |
| 1,916,392 | A | * 7/1933 | Slade ....................... | B03B 5/58 209/18 |

(Continued)

*Primary Examiner* — Joseph C Rodriguez
(74) *Attorney, Agent, or Firm* — Greenberg Traurig LLP

(57) ABSTRACT

A cyclonic separation and materials processing method and system is presented in which materials entry at one end and which is arranged so that the materials that enter will be given a tangential velocity component as they enter. Specific embodiments include a three-dimensional sorting system with the use of an outward centrifugal motion and up/down (or vertical) motion flow of water or other media, which can be thought of as "a three-dimensional separation".

6 Claims, 5 Drawing Sheets

Related U.S. Application Data

(60) Provisional application No. 62/264,141, filed on Dec. 7, 2015, provisional application No. 62/286,346, filed on Jan. 23, 2016.

(51) Int. Cl.
*B03B 5/62* (2006.01)
*B04C 9/00* (2006.01)

(56) References Cited

U.S. PATENT DOCUMENTS

| | | | | | |
|---|---|---|---|---|---|
| 2,854,136 | A * | 9/1958 | Gillie | ............ | B03B 5/38 209/158 |
| 2,877,896 | A * | 3/1959 | Sama | ............ | B03B 5/38 209/172.5 |
| 3,351,195 | A * | 11/1967 | Hukki | ............ | B01D 21/26 209/39 |
| 4,034,861 | A * | 7/1977 | Fontein | ............ | B03B 9/061 209/10 |
| 4,038,178 | A * | 7/1977 | Hukki | ............ | B03B 5/38 209/161 |
| 4,346,010 | A * | 8/1982 | Ogino | ............ | B03B 1/04 209/49 |
| 4,999,115 | A * | 3/1991 | Peterson | ............ | B01D 21/0018 210/202 |
| 5,305,888 | A * | 4/1994 | Meylor | ............ | B03B 5/28 209/164 |
| 5,601,703 | A * | 2/1997 | Szymocha | ............ | B03B 5/623 209/164 |
| 6,024,226 | A * | 2/2000 | Olivier | ............ | B03B 9/061 209/172.5 |
| 7,255,233 | B2 * | 8/2007 | Daniels | ............ | B03B 5/36 209/162 |
| 7,954,642 | B2 * | 6/2011 | Jody | ............ | B03B 5/623 209/158 |
| 9,782,780 | B2 * | 10/2017 | Adams | ............ | B03B 5/623 |
| 10,486,164 | B2 * | 11/2019 | Valerio | ............ | B03B 5/38 |
| 2008/0135461 | A1 * | 6/2008 | Olivier | ............ | B03B 5/36 209/162 |
| 2008/0257794 | A1 * | 10/2008 | Valerio | ............ | B03B 9/061 209/567 |

* cited by examiner

SYSTEM AND METHOD FOR SEPARATING MATERIALS USING STIRRING MOTION, STRATIFICATION, AND VERTICAL MOTION

CROSS-REFERENCE TO RELATED APPLICATIONS

This application is a continuation of U.S. patent application Ser. No. 16/060,395, now U.S. Pat. No. 10,486,164, which is a national phase application of International Application No. PCT/US2016/065458, filed May 22, 2015, which application claims the benefit of and priority to U.S. Provisional Application Nos. 62/264,141 filed on Dec. 7, 2015 and 62/286,346 filed Jan. 23, 2016, the entire contents of which are all incorporated herein by reference.

TECHNICAL FIELD

This application relates to a method and system for sorting materials. More specifically, this application relates to a method and system that employs an impeller or stirrer inside a cyclone to sort and recover materials from waste stream.

BACKGROUND

Recycling of waste materials is highly desirable from many viewpoints, not the least of which are financial and ecological. Properly sorted recyclable materials often can be sold for significant revenue. Many of the more valuable recyclable materials do not biodegrade within a short period. Therefore, recycling such materials significantly reduces the strain on local landfills and ultimately the environment.

Separation and recovery of solid waste and waste-stream components can be accomplished using many techniques, processes and devices. Costs and complexity of separation, particularly the inability to provide clean/perfect separation of recoverable fractions, are the usual drawbacks, delivering a disadvantage to many recycling processes where the process costs more than the resulting recovered/recoverable materials are capable of generating in the market. The quantity of waste to be treated has a direct effect on the ability to use known processes for separation and recovery of components, and/or the cost-effectiveness of those processes. This combination of diverse materials and diverse material sizes, densities, shapes and moisture content provide a unique challenge in separating and recycling specific materials in an efficient manner. The ability to efficiently separate and concentrate recyclable materials at high throughputs from the different waste streams reduces the negative environmental impact of these materials, as less of this residue will be disposed of in landfills.

Accordingly, there is always a need for improved separation techniques and systems. It is to this need, among others, that this disclosure is directed.

SUMMARY

A cyclonic separation and materials processing method and system is disclosed in which materials enter at one end and which is arranged so that the materials that enter will be given a tangential velocity component as they enter. Certain embodiments include a three-dimensional sorting system with the use of an outward centrifugal/stirring motion, an up/down (or vertical) motion from the flow of water or other media, and a media separation, which can be thought of together as provide "a three-dimensional separation." A low-frequency, high-amplitude pulsing of the media can cause a good distribution of the particles in the cyclone.

One embodiment includes a separator for the separation of a waste stream, the separator having a cyclone, a stirrer (e.g., an impeller), and an inlet for accepting the waste stream; a dewatering device; and a screw conveyor. The dewatering device can be a dewatering screen, dewatering conveyor, a screw conveyor or bucket elevator. The cyclone has a cylindrical housing having an interior surface, and inlet and an outlet.

In another embodiment, the separator can have a fixed screen that screens larger sized materials from reaching the bottom of the cone, which is provided at an angle inside the conical housing of the cyclone. Water or other media can fill the entire cyclone to a predetermined level. On the top of the cyclone, an impeller or stirrer may be used to agitate the water or to create a centrifugal motion. When the water hits the rotating impeller, energy of the impeller is transferred to the water, forcing the water outward (centrifugal force, jolt surge effect). The water is displaced outward, and more water can enter the suction side of the pump to replace the displaced water. Materials to be sorted can enter the cyclone through a feed chute/inlet located, e.g., on the top of the cyclone next or above of the impeller. In one example, the impeller comprises a shaft that extends from the center-top cylindrical portion of the cyclone down towards the cone. On the bottom of the shaft, fixed paddles are provided. In operation, the impeller rotates to generate a centrifugal motion of the water. The centrifugal motion or stirring motion may be generated by the impeller or stirrer.

Another embodiment includes a method for separating and recovering materials from a waste stream, the method comprising (a) feeding the materials into a separator having media that has specific gravity between about 1.0 and 3, wherein the separator has a centrifugal/stirring motion and a vertical motion therein, (b) flowing media into the cyclone to generate the specific gravity, (c) collecting light materials that float on a top portion of the separator, and (d) collecting the heavy materials through a bottom portion of the separator.

The details of one or more embodiments are set forth in the accompanying drawings and the description below. Unless otherwise defined, all technical and scientific terms used herein have the meaning commonly understood by one of ordinary skill in the art to which this invention belongs. All publications, patent applications, patents, and other references mentioned herein are incorporated by reference in their entirety. In case of conflict, the present specification, including definitions, will control. Other features and advantages of the invention will become apparent from the description, the drawings, and the claims.

DETAILED DESCRIPTION

In general, this disclosure includes methods and systems for separating materials in a waste stream. The methods and systems can separate a heterogeneous mixture of particulate solids. The solids can have a plurality of different specific gravities, which can be sorted using a three-dimensional sorting system that may include, e.g., a cylinder with a cone beneath, together referred to as a cyclone.

Certain embodiments include a three-dimensional sorting system with the use of an outward centrifugal/stirring motion, an up/down (or vertical) motion from the flow of water or other media, and a media separation, which can be thought of as provide "a three-dimensional separation." A low-frequency, high-amplitude pulsing of the media can cause a good distribution of the particles in the cyclone. A low-frequency, high-amplitude pulsing of the media can cause a good distribution of the particles in the cyclone. In one example, the speed of the stirrer can be reduced to slow the stirring of the media, which can increase the residence time of the material and media so that particles/material have more time to separate. In certain examples, the speed of the stirrer can be between about 1 to 600 ft per second.

One embodiment includes a separator for the separation of a waste stream. The separator has a cyclone having a screen, a stirrer (e.g., an impeller), and an inlet for accepting the waste stream; a dewatering device; and a screw conveyor. The dewatering device can be a dewatering screen, dewatering conveyor, a screw conveyor or bucket elevator. The cyclone has a cylindrical housing having an interior surface, and inlet and an outlet. A fixed screen, around the base of the cyclone, screens larger sized and impedes materials from reaching the bottom of the cone. The cone has an angle inside the conical housing of the cyclone. Water or other media can fill the entire cyclone to a predetermined level. On the top of the cyclone, an impeller may be used to agitate the water in a centrifugal motion. When the water hits the rotating impeller, energy of the impeller is transferred to the water, forcing the water out (centrifugal force, jolt surge effect). The water is displaced outward, and more water can now enter the suction side of the pump to replace the displaced water. Materials to be sorted can enter the cyclone through a feed chute/inlet located, e.g., on the top of the cyclone next or above of the impeller. In one example, the impeller comprises a shaft that extends from the center-top cylindrical portion of the cyclone down towards the cone. On the bottom of the shaft, fixed paddles are provided. In operation, the impeller rotates to generate a centrifugal motion in the water. The centrifugal motion is generated by the impeller.

Figure 1A:
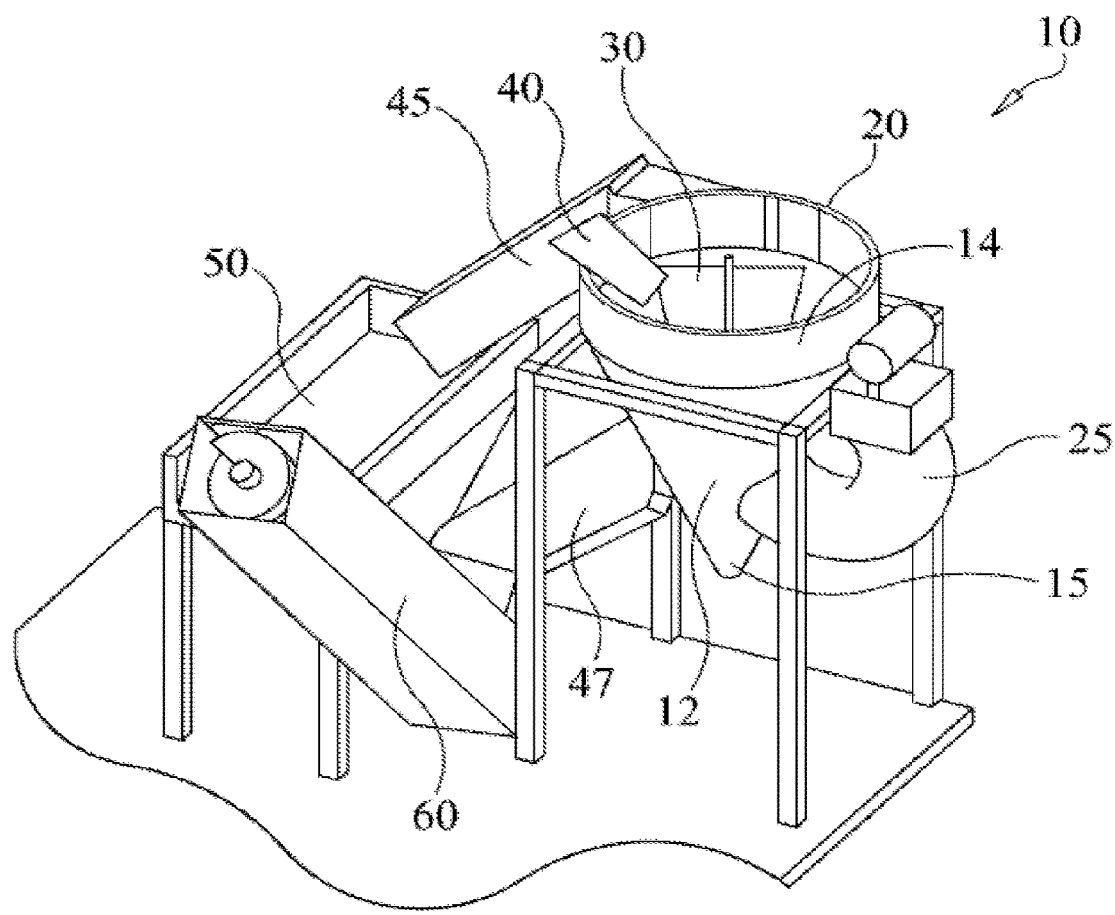
FIG. 1A is a perspective view of the three-dimensional separator according to this disclosure.
Figure 1B:
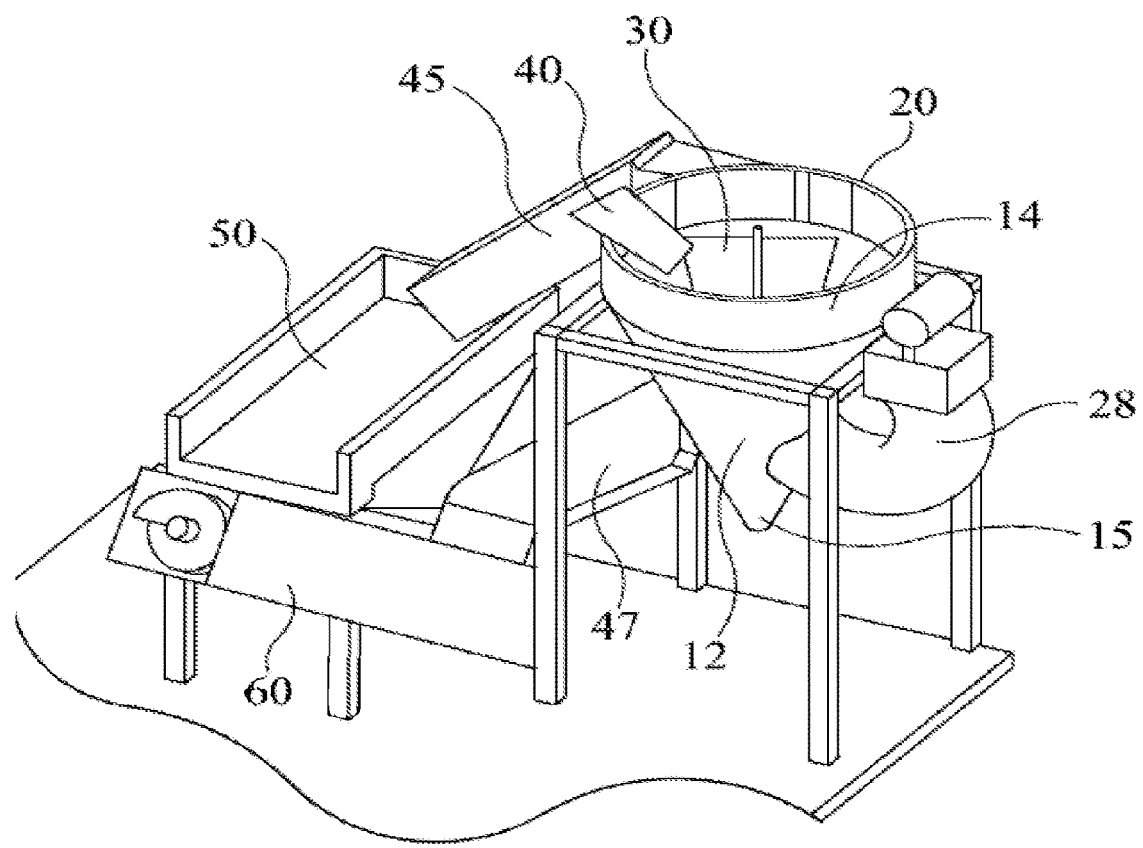
FIG. 1B is another perspective view of the three-dimensional separator according to this disclosure.

FIGS. 1A, and 1B show an exemplary apparatus employing a three-dimensional separation process and system. The separator 10 has a cyclone 20, an impeller 30, and an inlet 40 for accepting the waste stream, a dewatering device 50; and a screw conveyor 60. As can be seen, material or the waste stream can be fed through a feed chute 40 into the three-dimensional separator 10 on the top section of the cyclone 20. The cyclone 20 generally has a cylindrical top section 14 and a conical bottom section 12—however, the cyclone 20 need not have a conical bottom portion. The impeller 30 agitates in centrifugal motion or stirs the media, which flows into the cyclone. A constant flow of media, or a pulsating flow of water or media, is provided through a media circuit with, e.g., an inlet pipe or chamber 25 connected to the bottom portion of the cone 12, which creates a vertical motion in the cyclone 20. Three separated products exit the three-dimensional separator 10 as follows: A first discharge for, e.g., the "lights" discharge through the passage 45, a second discharge for, e.g., the fine discharge through "hutch" discharge 15, and a third discharge for e.g., the "heavies" discharge through the chute 47.

As can be seen, the lights discharge passage 45 can be provided with a de-watering screen 50 or similar de-watering device such as a de-watering conveyor, screw conveyor or bucket elevator. The heavies discharge 47 can be coupled with a discharge gate or a dewatering screw conveyor 60 as depicted on the figures. Finally, the hutch discharge device 47 can be provided with a pinch valve, rotary valve, de-watering screw conveyor, de-watering screen or a combination of such.

Figure 2:
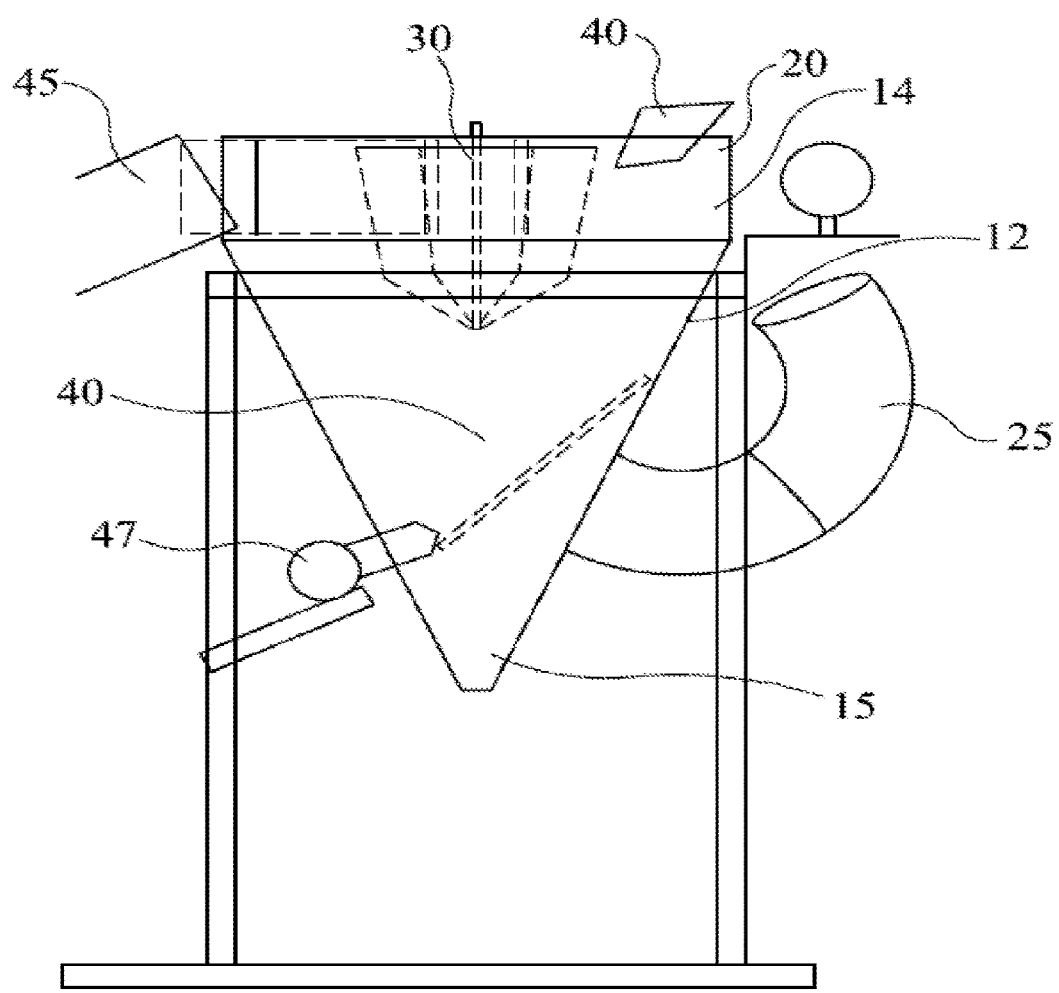
FIG. 2 is a cross-sectional top view of the three-dimensional separation apparatus according to this disclosure.

FIG. 2 shows an exemplary apparatus or system in which the cyclone 20 has a fixed screen 40 located at an angle inside the conical section 12 of the cyclone 20. A constant flow of water or media, or a pulsation of the media, is provided through e.g., an inlet pipe or chamber 25 connected to the bottom of the cone 12 below the screen 40. The separator 10 has a cyclone 20, an impeller 30, and an inlet 40 for accepting the waste stream, a dewatering device 50; and a screw conveyor 60. As can be seen, material or the waste stream can be fed through a feed chute 40 into the three-dimensional separator 10 on the top section of the cyclone 20. In one embodiment, there is a screen in the cyclone that is at an angle. The screen may be a size suitable for a specific recovery application. The screen can be angle to allow the heaviest materials to sink to the bottom of the cyclone while allowing other material to remain in the suspension. The angle of the screen can be between 40 degrees and 70 degrees from the horizontal axis of the cyclone. In one example, the screen is positioned at an angle of about 55 degrees from the horizontal plane of the cyclone.

The term "screen" as used herein is intended to include any mesh-like sieve or grid-like device or perforated structure used to separate particles or objects. The screen helps retain and prolong the exposure of the heavies to the processing fluid. In one example, the screen or screens each have a mesh size of 2-4 mm. However, the mesh may be larger or smaller and also may vary from screen to screen. The screen can have a unique mesh orientation, depending on the application, to create a mesh interference pattern along the axis between the top and bottom of the cyclone. For example, the mesh orientations of the screens are adjusted from one another about the central axis, although the degree or rotation between adjacent screens may be anywhere between 40 and 70 degrees, depending upon the shape of the openings.

Figure 3:
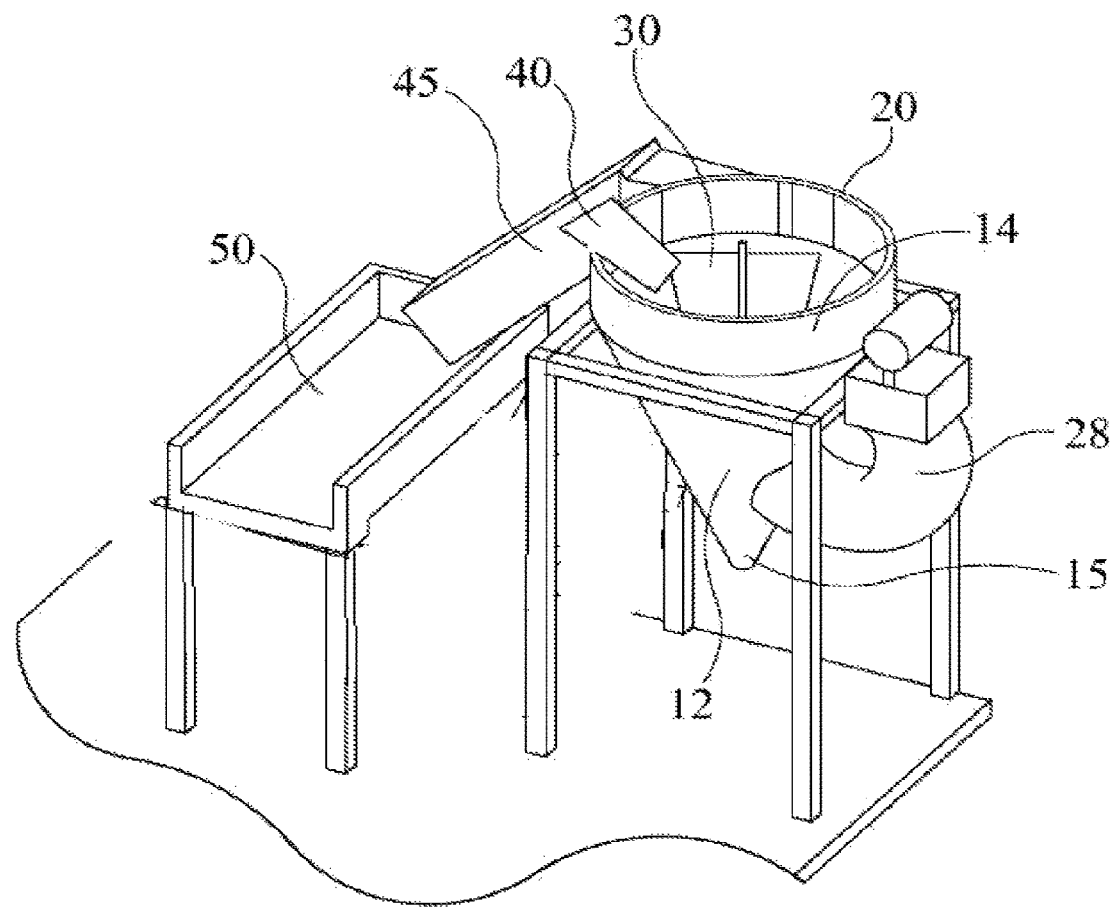
FIG. 3 is a perspective view of another three-dimensional separator according to this disclosure.
Figure 4:
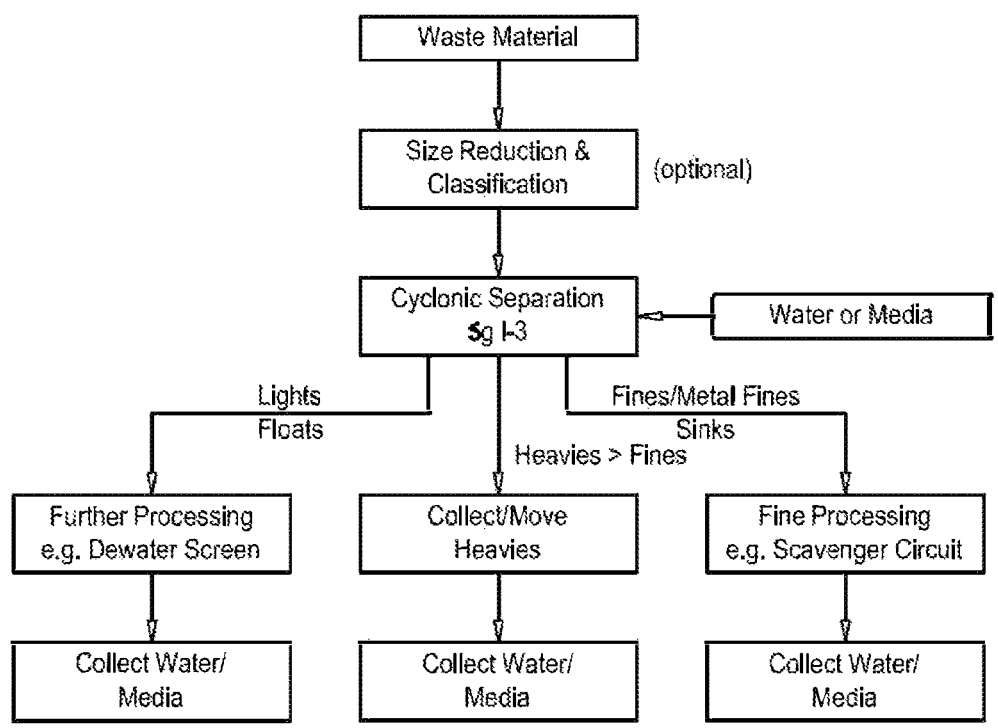
FIG. 4 illustrates a method of separating materials according to this disclosure.

FIG. 3 shows another exemplary apparatus employing a three-dimensional separation process and system. The separator 10 has a cyclone 20, an impeller 30, and an inlet 40 for accepting the waste stream; a dewatering device 50; and a screw conveyor 60. As can be seen, material or the waste stream can be fed through a feed chute 40 into the three-dimensional separator 10 on the top section of the cyclone 20. The cyclone 20 generally has a cylindrical top section 14 and a conical bottom section 12. Again, the bottom section need not be conical and may be cylindrical. The impeller 30 agitates in centrifugal motion or lightly stirs the media, which flows into the cyclone from a media circuit. A constant flow of water or media, or a pulsating flow of water or media, is provided through a media circuit with, e.g., an inlet pipe or chamber 25, which creates a vertical motion in the cyclone 20. In this embodiment, two separated products exit the three-dimensional separator 10 as follows: A first discharge for e.g. the "lights" discharge through the passage 45, and a second discharge for, e.g., the "heavies" discharge through the chute 15. As can be seen, the lights discharge passage 45 can be provided with a de-watering screen 50 or similar de-watering device such as a de-watering conveyor, screw conveyor or bucket elevator. A conveyor, e.g., a screw conveyor (not shown) can convey the heavies away from the separator. In certain examples, using a larger sized media and/or a slower stirred can result in increased separation.

The stratification from the vertical motion or up/down motion is generated through an axial connection provided underneath the screen in the conical section of the cyclone. Such connection allows for water or other media to enter to the cyclone. Such water or media that enters through the axial connection generates an upward and downward motion, therefore the third-dimension of the separation apparatus. The axial connection may also be tangential and in the form of a pipe or chamber. One example of the stratification apparatus can be an air-over-water pulsating chamber or water pulsation generated in an air chamber. In such an example, air inside a chamber expands and contracts creating an upward and downward flow of water into the cyclone through the axial or tangential connection.

The centrifugal motion allows for materials to spin or stir inside the cyclone. The resulting centrifugal action causes heavier particles to be thrown towards the outer wall of the cyclone (or have a higher residence time), and they are then allowed to slide down the cylindrical and conical walls towards the screen. The finer heavier recyclables that sink to the bottom are small enough to pass through the screen openings, and are discharged at the bottom of the cone with the use of a discharge device such as a valve, movable gate or rotary valve that prevent the continuous discharge of water but allows the finer heavier recyclables to exit when the device is energized. The lighter materials that stay in suspension on the top of the cyclone are eventually discharged continuously by the carrying circular current through a tangential passage located on the high side of the cylinder. The materials can then move through the cyclone towards an outlet for the heavier fraction (or the so called "underflow" fraction)

FIG. 3 illustrates a method or process for sorting materials, the method comprising feeding the materials into a separator having media that has specific gravity of about 1 to about 3, wherein the separator using a centrifugal motion and a vertical motion. In another example, the media has a specific gravity between 1.1 and 3. The media is pulsed or flows into the cyclone. The light materials can be collected from a top portion of the separator, the heavies can be collected through a middle portion of the separator, and the fines can be collected from the bottom portion of the separator. The lights may be fed into a sieve or processed otherwise. The heavies may be moved away using a conveyor, e.g., as a screw conveyor. The fines may be further processed, discarded, or combined with another material. The media can be water. The media can also have dirt, sand, glass fines, ferrous fines, ash residue and combinations thereof. The media from each product may be collected and reprocessed in a media circuit, which is a known type of circuit. In an embodiment in which the separator does not have a screen, two products, namely, the heavies and lights would be collected. In such embodiments, a media with a high specific gravity may produce better results (e.g., 1.4).

The rotational speed of the impeller as well as the frequency and stroke of the stratification apparatus of the cyclone may be varied to optimize the separation process. Without intending to be bound to specific theory, these two effects are combined into a single separation unit in which several principles come into play such as the Archimedes Principle, which explains how the apparent weight of an object immersed in water decreases. Other principles applied due to the three-dimensional separation includes the Hindered Settling effect, the Consolidation Trickling effect, as well as the Jerk Effect also referred to as Jolt Surge effect that is caused by both the centrifugal motion created by the impeller and the upward/downward movement of the stratification component.

The upward and/or downward motion of the media enhances the separation by reducing the amount of lighter materials that are misplaced or entangled with heavier materials that sink to the bottom of the three-dimensional separator. Such upward and downward motion, referred to as the third separation dimension, can be provided through the axial or tangential pipe or chamber in the form of pulses that generate upwards and downward currents of other media, pulse chamber. Such inflow and outflow of water to the cyclone generates a rising current of water that improves the separation efficiency and a downward flow of water allows for the heavier particles to stratify on top of the screen provided inside the cone. The shear and suspension of the material also helps separate the material.

The heavier materials that sink to the top of screen are discharged through a material discharge device such as a valve, gate, rotary valve, sealed bucket conveyor or sealed screw conveyor to allow for the heavier materials to exit the cyclone while reducing the amount of water or media that flows therethrough. The additional water or media that is required to make up for the lost water or media that abandons the cyclone through the lighter material discharge, fine heavier material discharge or the heavy material discharge zones may be added to the cyclone. The water supply should be the correct volume and pressure—too low of flow and pressure may result in poor separation and too high of flow and pressure may cause instability in the cyclone.

The separated products produced in the three-dimensional separation apparatus or system may be designated as follows: (1) the "lights", which are discharge through an exit passage located on the top of the cyclone; (2) the "fine heavies" or "hutch product", which consists of fine particles that have a specific gravity large enough that they sink to the bottom of the cone/cyclone by passing through the openings of the screen; and (3) the "heavies", which consists of the heavies that sank to the bottom of the cyclone but are not small enough to pass through the screen. The system or separator can also discharge unwanted solids with the heavies fraction.

In an alternate embodiment, the axial or tangential pipe or chamber may generate a constant inflow of water or media rather than constant pulsating streams of media. Such continuous up flow of water will still generate the third-dimension of separation to enhance the efficiency of the separation and may be used when processing different materials. For example, the pulsating upward and downward motion may be used when processing prone to entanglement recyclables such as recyclables containing insulated or bare wire. The inflow and outflow of water or other media will reduce the chances for light recyclables from ending on the heavy fraction.

In another embodiment, the media or fluid used in the recovery system may be any liquid capable of washing the materials and causing the metal to suspend into the process fluid. In other embodiments, the recovery system may use chemicals which can extract and suspend the desired constitute. Examples of such solutions are well known to those of skill in the art. One example of such a solution is water. In other embodiments, chemicals, minerals and or any magnetic material that can be used to change the specific gravity of the fluid to obtain an actual constant specific gravity range of 1.0 to 3.0 SG depending on the application. The 1.0 specific gravity separation chamber, because there is no added suspension media component it, that is, the liquid is water. Another alternative for attaining specific gravities of greater than 1.0 specific gravity media is through the use of magnetite or or ferrosilicon, sand and mixtures thereof. In one example, the sand have a size less than 200 mesh, which is a byproduct of aggregate production, can be used. A specific gravity of about 1.6 can be used to separate organic and inorganic materials, about 3 can be used to separate heavy metals, and about 1.8 to 2.0 can be used to separate aluminum/magnesium.

In another embodiment, in some cases the media includes inorganic dirt, sand, glass fines, ferrous fines, ash (e.g., incinerator bottom ash, automobile shredder residue (ASR)), or fines, and combinations thereof, which can be screened with a screen having 16 mesh or less to create a suspension or media having a specific gravity of 1.5 or 1.6 SG or higher. In certain examples, the particles had a size less than 325 mesh (44 microns). In other examples, the particles had a size greater than 200 mesh (74 microns). In such cases, the apparatus can use inorganic media fines that can come from automobile shredder residue fines, shredder fines from Hammermill operations, ferrous slag or inorganic fine byproducts from incineration and/or pyrolysis operations. Further, other minerals that may be mixed in a landfill containing metals can be used. In one example, fines from a ball mill process (of e.g., ash) having 200 mesh or greater can be used to generate media, which can be used for as media to obtain media up to 3 SG.

By using media with a specific gravity of 1.6 SG or higher, the costs to an operator can be reduced or nullified, that is, the costs to the operator may be net zero. Media with a specific gravity of 1.6 SG or higher can be separate organics and inorganics. A main difference between organics and inorganics is the fact organics contain carbon and that organics can then be used to produce a BTU feedstock for incineration, pyrolysis, or other separation to produce salable plastics, rubber, foam etc.

The material fed into the separator may be size reduced and classified through techniques for converting streams into fragments and particulates. For example, a shear shredder or screening may also be used to shred or size reduce the solid wastes and waste streams, to cause size reduction, fragmentation and particulate formation. In one example, the material is sized from about 0-12 mm, which in the case ASR and electronic scrap, the majority of recovered material will include inorganics, glass, rock, any other minerals. The material can also be sized from about 12 to about 100 mm, and greater than 100 mm. The solid wastes and waste stream materials can be size fragmentized into, e.g., discrete sizes. In some examples, the feed size is not the same as the screen size, which can lead to improved performance.

The simultaneous centrifugal and vertical motions of the three-dimensional separator enhances the separation efficiency of the materials by processing high throughputs and reducing the limitations of typical recyclable materials such as moisture content. The three-dimensional separator may provide a cost-effective method of concentrating recyclable materials into discrete specific gravities doing so at higher throughputs than typical sorting technologies. Such discrete specific densities are determined by the centrifugal speed of the water or media generated by the impeller as well as by the inflow and outflow of water through the bottom pipe or pulse chamber. More narrowly sized fragments can provide for the better separation.

In another embodiment, there can be multiple separation systems that use two or more separators to separate materials in a mixture. The multistage systems can include multiple cyclone separators.

Although the present disclosure has been described in detail, it should be understood that various changes, substitutions, and alterations can be made herein without departing from the spirit and scope of the disclosure as defined by the appended claims. The application describes particular embodiments. Other embodiments are within the scope of the following claims.

The invention claimed is:

1. A separator for separating and recovering materials from a waste stream, the separator comprising:
   a source of the waste stream;
   a cyclone having an impeller, a feed chute, and an inlet for accepting media, wherein the cyclone has a top section and a conical bottom section, the inlet is within the conical bottom section, and the waste stream enters the cyclone through the feed chute, the impeller rotates in a first direction about an axis in the cyclone; a source of media having a specific gravity between 1.1 and 3.0, wherein the media enters the conical bottom section through the inlet as a flow of media or a pulsating flow of the media, and the source of media is in fluid connection to the cyclone through the inlet generating an upward flow within the cyclone;
   a first discharge passage for a collecting a light fraction;
   a second discharge passage for collecting a heavy fraction;
   a third discharge passage, below the second discharge passage, for collecting a fine fraction.

2. The separator of claim 1, wherein the separator is operatively connected to a dewatering device.

3. The separator of claim 1, wherein the dewatering device is a dewatering screen.

4. The separator of claim 1, wherein the dewatering device is a dewatering conveyor, a screw conveyor or bucket elevator.

5. The separator of claim 1, wherein the media has dirt, sand, glass fines, ferrous fines and combinations thereof.

6. The separator of claim 1, wherein the media is pulsed with an air-over-water chamber.

* * * * *